UNITED STATES PATENT OFFICE.

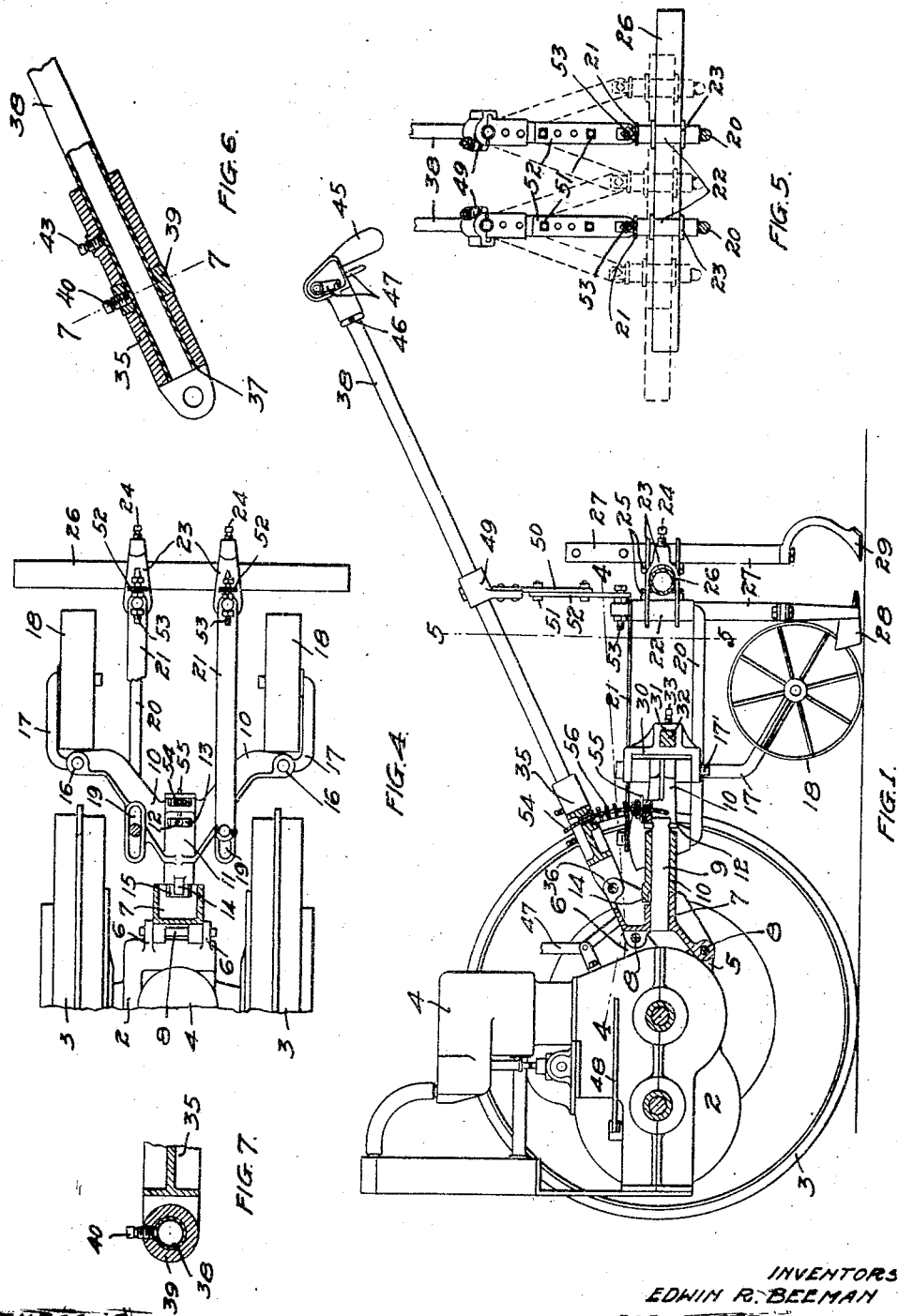

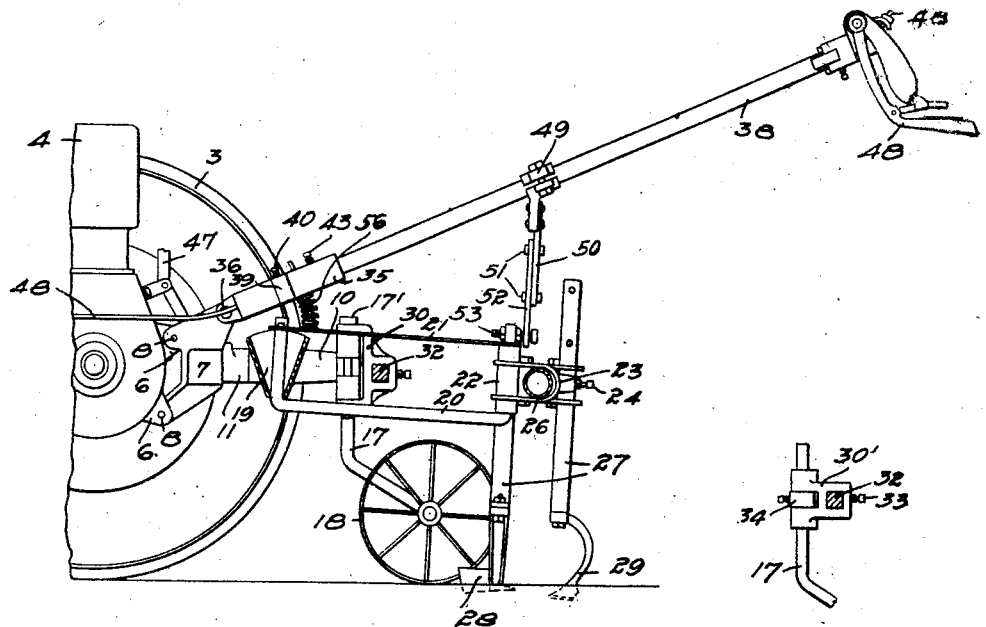
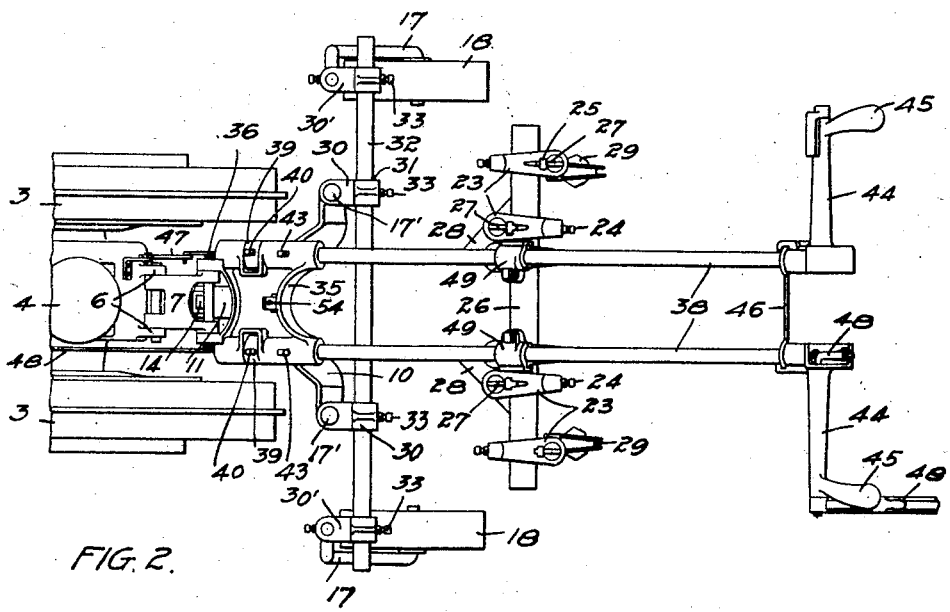
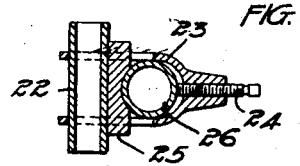

EDWIN R. BEEMAN AND CORNELIUS A. PETERS, OF MINNEAPOLIS, MINNESOTA, ASSIGNORS TO BEEMAN GARDEN TRACTOR CO., OF MINNEAPOLIS, MINNESOTA, A CORPORATION.

AGRICULTURAL IMPLEMENT.

1,288,805.   Specification of Letters Patent.   Patented Dec. 24, 1918.

Application filed December 10, 1917. Serial No. 206,465.

*To all whom it may concern:*

Be it known that we, EDWIN R. BEEMAN and CORNELIUS A. PETERS, citizens of the United States, residents of Minneapolis, county of Hennepin, State of Minnesota, have invented certain new and useful Improvements in Agricultural Implements, of which the following is a specification.

The object of our invention is to improve the steering device and the connections of the ground-working implements with the machine of the apparatus shown and described in the patent to Cornelius A. Peters, No. 1,245,121, issued October 30, 1917.

Other objects of the invention will appear from the following detailed description.

The invention consists generally in various constructions and combinations, all as hereinafter described and particularly pointed out in the claims.

In the accompanying drawings forming part of this specification,

Figure 1 is a side elevation, partially in section, of an agricultural implement embodying our invention.

Fig. 2 is a plan view of the same.

Fig. 3 is a vertical sectional view, showing the details of the connection between the ground-working implements and the machine frame, Fig. 4 is a plan section, substantially on the line 4—4 of Fig. 1, Fig. 5 is a vertical sectional view on the line 5—5 of Fig. 1, Fig. 6 is a detail sectional view, showing the manner of mounting one of the steering posts, Fig. 7 is a detail sectional view, taken on the section line 7—7 of Fig. 6, Fig. 8 is a detail sectional view, showing the means for mounting the caster wheels when they are set out at some distance on each side of the machine, Fig. 9 is a detail sectional view, showing the means for securing the ground-working implements to their transverse supporting bar or carrier.

In the drawing, 2 represents the frame of the machine, having carrying and traction wheels 3 and an internal combustion engine 4 of suitable type thereon. The frame of the machine is preferably provided with lugs 5 and 6 to which a casting 7 is secured by pins 8. In this casting a rearwardly projecting stud 9 is preferably secured. A yoke 10 has a sleeve 11 thereon to receive the stud 9 on which the yoke is free to rock but is limited in its movement by a pin 12 which projects into a slot 13 in said sleeve and by a lug 14 which projects into a recess 15 in the casting 7. The pin 12 also has the further function of holding the sleeve and yoke in place on the stud. The outwardly projecting arms of the yoke 10 have vertical sockets 16 therein to receive the ends of rods 17 on which caster wheels 18 are mounted, said rods being free to rock on a vertical axis in said sockets to allow the wheels to accommodate themselves to the change of direction in the movement of the machine. The yoke is also preferably provided on each side of its axis with a V-shaped socket 19 into which the upwardly turned forward ends of draft rods 20 are inserted. Said ends have bearings in the lower walls of the socket and project upwardly through the same and are preferably connected with the corresponding upwardly turned rear ends of said rods by means of bars 21 which serve to hold the draft rods in place in the sockets 19. The rear upwardly turned ends of the rods 20 are preferably provided with sleeves 22. A U-shaped clamp member 23 is mounted on each sleeve 22 and is provided with a clamping screw 24 between which and a block 25 seated on the sleeve 22 an implement carrying bar or pipe 26 is inserted (see Fig. 9). The clamping screw 24 bears on the wall of the pipe or other support for the implements and this pressure is in turn transmitted to the block in the sleeve so that when the screw is tightened the pipe and the sleeve will be locked but the rods 20 will be free to oscillate in the sleeves to accommodate themselves to the different positions of the implements. This same form of clamp is preferably used on the bar or pipe supporting the implements for securing the shanks thereof. These shanks may be flat, round, or polygonal in cross section, as preferred, and may support implements of various shape, as indicated at 28 and 29, the shanks being inserted through the holes in the clamp member 23 in place of the sleeve 22, the block 25 engaging the edge of the shank and holding it firmly in place when once the clamping screw is secured. By loosening this screw the shanks may be raised or lowered, according to the depth it is desired to cultivate or plow, and the character of the soil in which the machine is working. By providing a clamp of this type we adapt the machine for use with a great variety of ground-working implements, some of which may have round shanks while others may have square or polygonal shanks with irregular faces, the clamp adapting itself to any style of shank which may be used. Suitable clamps 30 are pivoted on the ends of the yoke 10 by means of bolts 17' and have polygonal sockets 31 therein to receive a bar 32, also polygonal in cross section, which is fitted into said sockets and secured therein by suitable means, such as set screws 33. Clamps 30' are mounted on the bar 32 and have vertical bearings for the spindles 17 of the caster wheels, said clamps having recesses therein to receive collars 34 mounted on said spindles by means of which the spindles may be adjusted vertically in said clamps to raise or lower the caster wheels. The clamps 30' are secured on the bar by set screws 33 corresponding to those described with reference to the clamps 30. By loosening these set screws the caster wheels can be moved back and forth on the bar and may be set out a considerable distance on each side of the machine to adapt it for working on rough or uneven ground. The collar 34, while holding the caster wheel spindles against vertical movement, permits oscillation thereof and the movement of the caster wheels to follow the direction of travel of the machine.

We have shown small ground-working or cultivating tools mounted on the draft bar or carrier of the machine, but do not confine ourselves thereto, as many different types or styles of tools may be used in place of those shown.

In this machine we prefer to depart from the single type of steering post illustrated in the Peters patent above referred to and use two posts in parallel relation and spaced apart sufficiently so that the operator will have a clear vision between the posts of the rows of plants over which the machine is moving. For mounting these posts we prefer to provide the following described mechanism:

35 is a casting pivoted at 36 on the casting 7 by means of a suitable horizontal pivot. This casting has sockets 37 therein in which posts 38 are inserted. Collars 39 are secured on said posts within said sockets by set screws 40. These collars serve to hold the posts in place in their sockets, while permitting them to rock and shift the ground-working implements from side to side, the connections with such implements operating to limit suitably the rocking or rotary movement of the posts. We prefer also to provide the sockets 37 with clamping screws 43 by means of which the posts may be rigidly secured therein and held against rotary movement on a longitudinal axis in case it should be desired to operate the machine without making use of the feature of shifting the ground-working implements from side to side through the rotary movement of the steering posts. The outer ends of the posts are preferably provided with handle bars 44 terminating in hand grips 45, a connection 46 being provided between the bars to maintain the parallelism thereof. This connection 46 may be a link or rod, as shown, or any other suitable means for maintaining the posts in parallel relation. Adjacent to the hand grips are the lever devices 47 and 48 by means of which the clutch of the engine and the feed of the gas thereto is controlled. Each of the posts intermediate to its ends is provided with a clamp 49 and links 50 are secured to said clamps at one end and adjustably connected by bolts 51 with similar links 52 which are attached to the upper rear ends of the rods 20 by bolts 53. Upon loosening the bolts 51, the links may be adjusted one upon the other to vary the position of the steering posts with respect to the agricultural implements. When the posts are rocked on a longitudinal axis, the implements will be moved from side to side in an upright position, swinging on the pivotal connection between the links 52 and the rods 20. These clamps on the posts are preferably of the type shown, as they can be put on the posts or removed very easily and quickly, without dismounting the posts from the machine or removing the handle bars. A rotary adjustment of the clamps may be easily obtained by loosening the bolts thereon. Any other suitable type of clamp may be used in place of those shown, if preferred, and the links connecting the clamp with the draft rods may be modified in various ways, as experience in the use of the machine and the character of the work may seem advisable.

We prefer to provide a bar 54 adjustably mounted at its lower end on a pin 55 in the yoke 10, said bar having a series of holes therein into which said pin may be inserted to obtain the desired adjustment. A compression spring 56 is mounted on said bar between the yoke 10 and the casting 35 and normally resists the downward movement of the steering post and holds the ground-working implements 18 upon the ground with a yielding pressure. This bar may be adjusted to correspond to the adjustment of the links 50 and 52.

When pressure is applied to the steering posts and the implements are forced into the soil, the spring 56 will yieldingly resist such downward pressure and enable the operator to maintain quick control over the implements in depressing or elevating them and in a measure relieve him from the vibration or jar which a rigid connection might transmit from the draft rods to the handle bars. If desired, the compression spring may be removed and an ordinary cotter pin inserted into one of the holes of the bar to form a fixed support and prevent relative downward movement of the bar and the steering posts.

In the operation of the machine, the handle bars are grasped and the steering posts rocked on a longitudinal axis to shift the ground-working implements from side to side, as may be desired, while lateral pressure or movement of the steering posts from one side to the other will rock the machine on a vertical axis and steer it between or over the rows of plants. The operator, traveling behind the machine, will have a clear vision of the plants and at the same time can direct the implements in such a manner as to stir up the soil close to the plants without danger of damaging them. Furthermore, as in the Peters patent, when the implements are in the soil they will be held against lateral movement during the swinging of the machine frame so that the steering device may be oscillated laterally to guide the machine without affecting the movement of the ground-working implements.

It will be observed that the yoke 10, the draft rods 20 and the bars 21, together form what may be designated as an auxiliary frame, supported mainly upon the caster wheels 18, and carrying and supporting in turn the ground-working implements. The stud 9 forms a longitudinally extending axis or pivot pin upon which the main frame 2 and the auxiliary frame, made up of the parts specified, are adapted to oscillate with respect to each other, without interfering with the reciprocating or side to side movement of the carrying bar 26 and the ground-working implements. The auxiliary frame thus has a flexible connection with the main frame and can adjust itself to inequalities of the soil over which the machine is moving.

As the steering posts are hinged to the casting 7, which in turn is connected to the frame 2 of the machine, and as these steering posts are also connected through the links 52 with the carrying bar 26 to which the ground-working implements are secured, it follows that by raising the handle ends of the steering posts, the ground-working implements may be raised from the soil and by depressing said handle ends of said posts said implements may be forced downward or farther into the soil.

By swinging the handle ends of the steering posts laterally, the main frame of the machine, its supporting wheels and the parts supported by said frame are turned in the direction in which the operator desires the machine to travel. By rotating said steering posts on their axes the bar 26 and the ground-working implements carried by said bar are reciprocated laterally of the line of travel of the machine.

The operator by bearing down on one of the handle bars may rotate the post on which that bar is mounted on its longitudinal axis and through the rigid mounting of the bars on the posts and their pivotal connection with the ground-working implements, the said implements will be shifted laterally and a corresponding movement will be imparted to the other post and its handle bar. The implements may, therefore, be shifted by rotating either or both posts as desired, and in either case one arm will swing downward and the other upward while the posts will rotate simultaneously in the same direction through the rigid connection of the bars 50 and 52 with the posts and their pivotal connection with the implements.

We claim as our invention:

1. A machine of the class described, comprising, in combination, a frame having supporting means, a pair of steering posts, spaced apart, to provide an unobstructed view between them, and arranged in parallel relation, and each mounted on said frame for rotary movement on its longitudinal axis, ground-working implements connected with said frame, and having means connecting them with said posts, whereby as said posts are rotated said ground-working implements are moved from side to side of the draft line of the machine.

2. A machine of the class described, comprising, in combination, a frame having supporting means, a pair of steering posts, spaced apart, and arranged in parallel relation and each mounted for rotary movement on its longitudinal axis, ground-working implements connected with said frame to rock on a longitudinal axis and having means connecting them with said posts, whereby as said posts are rotated said ground-working implements are moved from side to side of the draft line of the machine.

3. A machine of the class described, comprising, in combination, a frame having carrying wheels, a steering device connected with said frame, a yoke, a longitudinally extending lug or pivot pin carried by said frame on which said yoke is mounted for movement of said yoke and frame with respect to each other, a series of ground-working implements, and means connecting said implements with said yoke.

4. A machine of the class described, comprising, in combination, a frame having carrying wheels, a steering device connected with said frame and mounted for rotary movement on a longitudinal axis, a yoke, a longitudinally extending lug or pivot carried by said frame, and on which said yoke is mounted for rocking movement of said yoke and frame with respect to each other, a series of ground-working implements, draft means connecting said implements with said yoke, and means connecting said implements with said steering device, whereby rotary movement of the steering device reciprocates said implements transversely of the line of travel of the machine.

5. A machine of the class described, comprising, in combination, a frame having carrying wheels, a steering device having a hinged connection with said frame and mounted for oscillatory movement on a longitudinal axis, a yoke, mounted for rotary movement on a substantially horizontal longitudinal axis, a series of ground-working implements, draft means connecting said implements with said yoke and means connecting said implements with said steering device, whereby rotary movement of the steering device reciprocates said implements transversely of the line of travel of the machine, and movement of said steering device on its hinged connection raises or lowers said implements vertically.

6. A machine of the class described, comprising, in combination, a frame having carrying wheels, a steering post mounted for rotary movement on its longitudinal axis, ground-working implements connected with said frame to rock on a longitudinal axis and having means for connection with said post to be shifted from side to side of the draft line of the machine by the rotary movement of said post, said implements being free to rock on said longitudinal axis independently of said frame and carrying means.

7. A machine of the class described, comprising a frame having carrying wheels, a yoke mounted for rotary movement on said frame, a cross bar carried by said yoke, ground-working implements connected with said yoke and a steering post connected with said frame and having means for connection with said ground-working implements for shifting the same transversely of the line of travel of the machine.

8. A machine of the class described comprising a frame having carrying wheels, a yoke mounted for rotary movement on said frame, caster wheels mounted on said yoke, a steering device having a pivotal connection with said frame above said yoke, ground-working implements connected with said yoke and means connecting said implements with said steering device.

9. A machine of the class described comprising a frame having carrying wheels, a yoke mounted for rotary movement on said frame, ground-working implements connected with said yoke and a steering device connected with said frame.

10. A machine of the class described, comprising, in combination, a frame having supporting means, a pair of steering posts spaced apart and arranged in parallel relation, and each mounted in said frame for rotary movement on its longitudinal axis, ground-working implements connected with said frame, means pivotally connected with said ground-working implements and having rigid connections with said posts, rotation of either or both of said posts on a longitudinal axis moving said ground-working implements from side to side of the draft line of the machine.

11. A machine of the class described, comprising, in combination, a frame having supporting means, a pair of steering posts spaced apart and arranged in parallel relation, and each mounted in said frame for rotary movement on its longitudinal axis, ground-working implements connected with said frame, bars pivotally connected with said ground-working implements and having rigid connections with said posts, rotation of either or both of said posts on a longitudinal axis, shifting said ground-working implements laterally of the draft line of the machine.

12. A machine of the class described, comprising, in combination, a frame having supporting means, a pair of steering posts spaced apart and arranged in parallel relation, and each mounted in said frame for rotary movement on its longitudinal axis, ground-working implements connected with said frame, bars composed of sections adjustably secured together, one bar section having a pivotal connection with the ground-working implements, the other bar section having a rigid connection with its steering post, rotation of either or both of said posts on a longitudinal axis shifting said ground-working implements laterally of the draft line of the machine.

13. A machine of the class described comprising a frame having carrying wheels, a steering device mounted for rotary movement on a longitudinal axis, a draft rod connected with said frame and mounted for horizontal movement on a vertical axis, and a tilting movement in a vertical plane, ground-working implements connected with said draft rod, and means connecting said draft rod with said steering device for shifting said draft rod from side to side through the rotary movement of said steering device or raising or lowering said rod to move said implements from or toward the soil.

14. A machine of the class described comprising a frame having carrying wheels, a yoke mounted on said frame and having a vertical socket therein flaring from the bottom toward the top, a draft rod having an upwardly turned end fitting within said socket for freedom of forward and backward and rotary movement therein, ground-working implements connected with said draft rod, a steering device having rotary movement on a longitudinal axis connected with said frame, and means connecting said steering device with said draft rod for shifting said rod and said implements laterally with the rotary movement of said steering device.

15. A machine of the class described comprising a frame having carrying wheels, a yoke connected with said frame and having vertical sockets therein, draft rods having vertical end portions fitting within said sockets, ground-working implements connected with said draft rods and a steering device connected with said draft rods for shifting them and said ground-working implements laterally or for raising or lowering them.

16. A machine of the class described comprising a frame having carrying wheels, a yoke having a rotary movement on said frame and provided with laterally extending arms, caster wheels for said arms, draft rods having pivotal bearings in said yoke, ground-working implements connected with said draft rods and a steering device having means for connection with said draft rods for shifting them and said ground-working implements laterally.

17. A machine of the class described comprising a frame having carrying wheels, a yoke connected with said frame, caster wheels mounted on said yoke, a steering device having a pivotal connection with said frame above said yoke, yielding means interposed between said yoke and said steering device for transmitting downward pressure exerted on said steering device to said yoke, ground-working implements connected with said yoke, and means connecting said implements with said steering device.

18. A machine of the class described comprising a frame having carrying wheels, a yoke connected with said frame, caster wheels mounted on said yoke, a steering device having a pivotal connection with said frame, a bar adjustably mounted in said yoke and having a sliding bearing in said steering device, a spring mounted to resist downward movement of said steering device on said bar and ground-working implements connected with said yoke and with said steering device and forced into the soil by downward pressure of said steering device.

19. A machine of the class described comprising a frame having carrying wheels, a yoke having a limited rocking movement on said frame, caster wheels mounted for oscillation in said yoke, draft rods having bearings in said yoke with freedom of lateral and vertical movement and extending rearwardly between said caster wheels, ground-working implements connected with said draft rods in the rear of said wheels and a steering device mounted to rotate on a longitudinal axis in said frame and means connecting said steering device with said draft rods for lifting said ground-working implements or shifting them laterally.

20. A machine of the class described comprising a frame having carrying wheels, a yoke mounted for rotary movement on said frame, draft rods having upwardly turned forward and rear ends, their forward ends being mounted in said yoke for oscillating said rods in a vertical or horizontal plane, ground-working implements having upwardly extending shanks connected with the upwardly turned rear ends of said rods, steering posts mounted for rotary movement on a longitudinal axis in said frame, and means connecting said steering posts respectively with the upwardly turned rear ends of said draft rods.

In witness whereof, we have hereunto set our hands this 1st day of December 1917.

EDWIN R. BEEMAN.
CORNELIUS A. PETERS.